United States Patent

[11] 3,630,676

| [72] | Inventors | George B. Davis<br>Creve Coeur;<br>Earle C. Makin, Jr., St. Louis; Herbert J.<br>Gebhart, Jr., Ferguson, all of Mo. |
|---|---|---|
| [21] | Appl. No. | 798,802 |
| [22] | Filed | Feb. 12, 1969 |
| [45] | Patented | Dec. 28, 1971 |
| [73] | Assignee | Monsanto Company<br>St. Louis, Mo. |

[54] SELECTIVE COMPLEX FORMATION FOR THE REMOVAL AND RECOVERY OF CARBON MONOXIDE FROM MIXED GAS STREAMS
10 Claims, No Drawings

[52] U.S. Cl........................................................ 23/204 M, 23/2 R
[51] Int. Cl........................................................C01b 31/18, B01j 1/22
[50] Field of Search...........................................23/204 M, 2 R, 2 S

[56] References Cited
UNITED STATES PATENTS

| 2,953,589 | 9/1960 | McCaulay..................... | 260/438.1 |

FOREIGN PATENTS

| 797,164 | 4/1936 | France......................... | 23/204 |

*Primary Examiner*—Oscar R. Vertiz
*Assistant Examiner*—Hoke S. Miller
*Attorneys*—M. N. Cheairs, Elizabeth F. Sporar and C. James Bushman ABSTRACT: A process for the separation of carbon monoxide from mixed gases comprising contacting said mixed gases with a first complex comprised of a cuprous salt selected from the group consisting of cuprous fluoroborate and cuprous fluorophosphate together with a hydrocarbon selected from the group consisting of aromatic hydrocarbons, olefin hydrocarbons and mixtures thereof to produce a second complex containing the carbon monoxide and recovering carbon monoxide from the resulting second complex phase.

SELECTIVE COMPLEX FORMATION FOR THE REMOVAL AND RECOVERY OF CARBON MONOXIDE FROM MIXED GAS STREAMS

BACKGROUND OF THE INVENTION

The present invention relates to a process for removing carbon monoxide from mixed gas streams. More particularly, the present invention relates to a process for the removal of carbon monoxide from mixed gas streams by selective complex formation.

Many industrial gases contain carbon monoxide in combination with hydrogen and often, such light hydrocarbons as methane and ethane. In many instances, such industrial gases are utilized primarily for the hydrogen content thereof. In such instances, however, quite frequently the catalysts employed are readily poisoned by the presence of carbon monoxide and therefore, it is necessary to remove the carbon monoxide from the mixed gas stream in order to prevent such poisoning. Particularly, such processes as ammonia synthesis and hydrofining generally require hydrogen substantially free of carbon monoxide. In other utilities, the industrial gases are utilized primarily for the carbon monoxide therein. Such utilities include phosgene and acrylate synthesis, and the like. In such utilization, it is necessary to substantially purify the carbon monoxide of hydrogen and other impurities prior to its use.

A number of means have been proposed by the prior art for the separation of carbon monoxide from admixture with hydrogen and other components of mixed gas streams. These means have included selective diffusion through palladium or platinum tubes or membranes and the reversible chemical reaction of carbon monoxide with various compounds such as methanol to form compounds which may in turn be disassociated back to CO and the reactant compound. Additionally, it has been proposed to selectively absorb carbon monoxide from gases by means of metal carbonyl complexes employing chromium, molybdenum or tungsten as the metal. Also, certain ammonium complexes of aqueous cuprous salts have been proposed for the selective absorption of carbon monoxide. However, none of these prior art techniques for the separation of carbon monoxide from mixed gases have been found to be as successful as desired, particularly from the commercial standpoint.

It is an object of the present invention to provide a new and improved process for the separation of mixed gases containing carbon monoxide. An additional object of the present invention is to provide a new and improved process for the separation of carbon monoxide from mixed gases which include hydrogen. Another object of the present invention is to provide a new and improved process for the separation of carbon monoxide from mixed gases by means of selective complex formation. A remaining object of the present invention is to provide a new and improved process for the separation of carbon monoxide from mixed gases by means of selective complex formation whereby greater selectivity for such carbon monoxide is obtained. Additional objects will become apparent from the following description of the invention herein disclosed.

SUMMARY OF THE INVENTION

The present invention, which fulfills these and other objects, is a process for the separation of carbon monoxide from mixed gases containing carbon monoxide, the process comprising contacting said mixed gases with a cuprous fluoroborate or cuprous fluorophosphate containing complex (hereinafter referred to as the "first complex" which contains in addition to such cuprous fluoroborate or cuprous fluorophosphate, aromatic and/or olefin hydrocarbons. Such contact results in the selective removal of carbon monoxide from the mixed gases by means of such carbon monoxide being retained within the cuprous fluoroborate or cuprous fluorophosphate containing complex phase. The carbon monoxide may be recovered from the complex phase by means of heating to thereby disassociate the carbon monoxide from the complex, by displacement with other compounds complexible with the cuprous fluoroborate or cuprous fluorophosphate, or by any other convenient means.

The process of the present invention is highly selective for the removal and separation of carbon monoxide from mixed gases in which the carbon monoxide is an admixture with such gases as hydrogen, methane, ethane and/or carbon dioxide. In addition to this selectivity and somewhat contrary to many conventional processes, the present process provides for a high loading of the carbon monoxide in the complex phase.

DESCRIPTION OF THE PREFERRED EMBODIMENTS OF THE PRESENT INVENTION

In the process of the present invention, the separation and removal of the carbon monoxide from mixed gas streams is obtained by the selective complexing of the carbon monoxide with a first complex which is one containing cuprous tetrafluoroborate or cuprous hexafluorophosphate. Generally, these cuprous salts are referred to merely as cuprous fluoroborate and cuprous fluorophosphate. Both of these salts are relatively unstable and cannot be readily formed as the salt. As a result, the usual practice is to form the salt in the presence of an organic compound with which the cuprous salt will complex, thereby forming the salt and the complex of the salt with the organic compound substantially concurrently.

The organic compounds in which the cuprous salts may be formed and with which such salts are immediately complexed may include any of a rather large number of such compounds. The choice of organic compound is often dictated by practical consideration in the particular operation of the present invention contemplated. Generally, however, the organic compounds will be aromatic hydrocarbons. Such aromatic hydrocarbons may contain a single aromatic ring or may contain two or more aromatic rings, either condensed or noncondensed. In addition, the aromatic hydrocarbons may have substituents to the ring or may be condensed with one or more other ring structures which are paraffinic or olefinic in nature. Nonlimiting examples of aromatic hydrocarbons suitable for use in preparing the cuprous salts of the present invention are benzene, toluene, the xylenes, various other polymethylbenzenes, such as mesitylene, isodurene, tri-, tetra-, penta- and hexamethylbenzenes, ethylbenzene and the various polyethylbenzenes, isopropylbenzenes, propylbenzene and the various polyisopropyl and polypropylbenzenes, the various butyl and pentylbenzenes and the like, the substituted benzenes containing two or more different substituents such as ethyltoluene, isopropyltoluene, and ethylxylenes; naphthalene, the various methylnaphthalenes, and polymethylnaphthalenes, ethylnaphthalene and the various polyethylnaphthalenes, the naphthalenes containing propyl, isopropyl, butyl, and pentyl substituents; the substituted naphthalenes containing two or more different substituents such as methylethylnaphthalene, methylpropylnaphthalenes, etc.; the various indanes such as methylindanes, ethylindanes, isopropylindanes, etc.; the dihydronaphthalenes such as methyl, ethyl, propyl, and butyl substituted dihydronaphthalenes; the tetrahydronaphthalenes and the like. In the preferred practice of the present invention, the aromatic hydrocarbons most often employed as the organic compound in forming the complexes of the present invention are benzene, naphthalene, partially hydrogenated naphthalenes and the various alkyl substituted derivatives of these wherein the alkyl substituents have no more than four carbon atoms per substituent. Within this group of preferred aromatic hydrocarbons are such compounds as benzene, ethylbenzene, toluene, the xylenes, naphthalene and the methylnaphthalenes, dihydronaphthalenes and the tetrahydronaphthalenes. A particularly useful group of aromatic hydrocarbons for use in forming the complexes is that including such compounds as toluene, ethylbenzene, ethyltoluene, the xylenes and tetrahydronaphthalene.

The method of preparing the cuprous fluoroborate-aromatic hydrocarbon containing complex which is used for the separation of hydrocarbon mixtures in accordance with the present invention may be any of those methods conventionally used. In U.S. Pat. No. 2,953,589, the preparation of cuprous fluoroborate-aromatic hydrocarbon complexes by the introduction of powdered copper, $BF_3$, and anhydrous HF into benzene or other aromatic hydrocarbons is disclosed. This method may be used for the purposes of the present invention. In addition, the cuprous fluoroborate-aromatic hydrocarbon complex may be prepared by dispersing $CuF_2 \cdot 2H_2O$ and metallic copper in an aromatic hydrocarbon and heating the reaction mixture while introducing gaseous $BF_3$ into the dispersed medium. This method is described in Journal of the American Chemical Society, Vol. 74, page 3,702, 1952. This latter described method is preferred for the practice of the present invention. In addition to these two methods of preparing the cuprous fluoroborate-aromatic hydrocarbon complex, any other of the methods known to those skilled in the art may be used.

Preparation of the cuprous fluorophosphate-aromatic hydrocarbon complex also may be any of those means known to those skilled in the art. Preferably, however, this complex is prepared by introducing anhydrous $CuF_2$ or $CuF_2 \cdot 2H_2O$, metallic copper and phosphorous pentafluoride into an aromatic hydrocarbon medium and heating with agitation to an elevated temperature in excess of 75° C. The cuprous fluorophosphate-aromatic hydrocarbon complexes may on occasion be solid at room temperature and therefore, must be maintained at elevated temperatures for use in the process of the present invention or, in the alternative, be used along with a suitable solvent. It is believed that impurities in the system cause these complexes to be solid. Among the solvents useful for maintaining the cuprous fluorophosphate in liquid phase are those containing oxygen and/or sulfur. Such solvents include ethers, ketones, sulfones, disulfides, thioethers, thioureas, nitro alkyl and aryl, trihydrocarbonylphosphines and the like. While the particular solvent selected is primarily a matter of individual choice, it is somewhat preferred that the solvent be one selected from the group consisting of the alkyl and aryl sulfone, particularly such compounds as sulfolanes and alkyl sulfolanes.

The cuprous fluoroborate and cuprous fluorophosphate first complexes, as above described, are thought to generally contain 1 mole of cuprous fluoroborate or cuprous fluorophosphate, as the case may be, and 3 moles of the aromatic hydrocarbon. For the purpose of describing and operating the process of the present invention, it may be assumed that such first complex is this form. If desired, all or a part of the aromatic hydrocarbon molecules of the complex may be replaced with olefin hydrocarbons and the resulting cuprous salt-aromatic hydrocarbon-olefin hydrocarbon or cuprous salt-olefin hydrocarbon complex used as the carbon monoxide extracting agent in accordance with the present invention. The degree to which the aromatic hydrocarbons may be replaced by olefin hydrocarbons generally is dependent on the amount of olefin utilized in displacing the aromatics. The greater the mole ratio of olefin hydrocarbons contacted with the cuprous salt-aromatic hydrocarbon complex, to the aromatic hydrocarbons in such complex, the greater is the degree of replacement of aromatic hydrocarbons with olefin-hydrocarbons which will occur. Included within the term olefin are the polyolefins such as dienes and trienes as well as the mono-olefins. These olefin hydrocarbons may range from as low in carbon number as ethylene to as high as those having 20 carbon atoms and higher. Generally, any of the olefin hydrocarbons liquid or liquefiable under the conditions defined herein for carrying out the separations process of the present invention may be successfully used. By liquefiable hydrocarbons is meant those which may be liquid at the elevated temperatures permissible in operating the present separations process or those hydrocarbons which are liquefiable by mutual solubility with other components of the system or by solvents inert to the present separations process. Most often, the olefin hydrocarbons employed will be those containing four to nine carbon atoms per molecule.

The amount of first complex employed in carrying out the present process usually is such as to result in a mole ratio of 0.3:1 to 1:1, preferably 0.5:1 to 1:1, of cuprous fluoroborate or cuprous fluorophosphate, as the case may be, to carbon monoxide in the mixture to be separated. While greater amounts of first complex may be employed, with no adverse result, there is no advantage in doing so since generally it results in lower efficiency of utilization of each molecule of first complex. The use of lesser amounts of first complex preferably is avoided in order to minimize the problem of precipitation of the cuprous fluoroborate or cuprous fluorophosphate-carbon monoxide complex. When the mole ratio of carbon monoxide to first complex approximates 3:1, many molecules of the first complex will tend to replace all three aromatic hydrocarbon molecules contained therein with three molecules of carbon monoxide. These cuprous fluoroborate and cuprous fluorophosphate complexes containing three molecules of carbon monoxide substituted therein are solid under ordinary conditions and thus, tend to precipitate from the system. Of course, the precipitation of these tricarbon monoxide substituted complexes presents mechanical problems in handling the complex. Generally, it is preferred to avoid such mechanical problems though under some conditions and circumstances it might be desirable to use high mole ratios of carbon monoxide to first complex to thereby form the tricarbon monoxide substituted solid complexes.

The temperature at which the mixed gas stream from which carbon monoxide is to be separated is contacted with the cuprous fluoroborate or cuprous fluorophosphate first complex will vary depending upon the ratio of carbon monoxide in such gas to the first complex and upon the degree to which it is desired to introduce molecules of carbon monoxide into such first complex. Generally, within the temperature ranges hereinbelow described, lower temperatures at any given carbon monoxide concentration, result in a larger number of moles of carbon monoxide being introduced into the first complex than is introduced at higher temperatures. Conversely, as indicated above, at any given temperature, as the carbon monoxide concentration is increased, the number of moles of carbon monoxide introduced into the first complex is increased. Generally, the temperature at which the present process is operated will be within the range of −30° to 90° C. Preferably however, within the hereinabove defined preferred ratios of carbon monoxide to first complex, it usually is preferred to operate the present process at temperatures within the range of 10° to 80° C.

The carbon monoxide may be recovered from the complex by any means available. Elevated temperatures of 50° to 100° C. generally will suffice to strip the carbon monoxide from the complex. Reduced pressure may also be employed isothermally or in combination with a temperature change to strip the carbon monoxide from the complex. A particularly useful means of recovering the carbon monoxide, however, involves displacement of the carbon monoxide with an aromatic or olefin hydrocarbon. In this recovery means, aromatic hydrocarbons or olefin hydrocarbons or mixtures thereof are brought into contact with the carbon monoxide containing complex at temperatures generally within the range of 30° to 150° C. and at substantially atmospheric pressure with the hydrocarbons being employed in at least molar equivalents to the amount of carbon monoxide in the complex. In this manner, the carbon monoxide is readily displaced from the complex and replaced with the aromatic and/or olefin hydrocarbons. This displacement method of recovering carbon monoxide is particularly useful in that the recovery cycle may be used as a means for the separation of aromatic and/or olefin hydrocarbons from saturated hydrocarbons. For example, instead of using an aromatic hydrocarbon per se to displace carbon monoxide, a difficultly separable mixture of aromatic and naphthenic hydrocarbons might be brought into contact with the carbon monoxide containing complex. Thereby, carbon monoxide would be displaced from the complex and the aromatic hydrocarbons of the mixture absorbed therein, thereby, in turn, resulting in the separation of the aromatic and naphthenic hydrocarbons.

The mixed gases which may be separated in accordance with the process of the present invention may contain in addition to carbon monoxide, such other gaseous materials as hydrogen, methane, ethane, nitrogen, and the like. In addition, such mixed gas streams may contain carbon dioxide but preferably do not contain oxygen. Also, it is preferred that the mixed gas be substantially free of water.

The contact of the mixed gas to be separated with the first complex may be by substantially any means which will effect good mixing of the mixed gas with the complex. For example, the first complex and the mixed gas stream may be passed countercurrent to one another through an absorption tower or the mixed gas may be bubbled through the first complex.

To further describe the preferred embodiments of the present invention and to illustrate the operation thereof, the following examples are presented. These examples are not to be construed as in any manner limiting the present invention.

EXAMPLE I

A cuprous fluoroborate-toluene first complex was prepared by passing excess $BF_3$ gas into a vigorously agitated mixture of 137.5 grams cupric fluoride dihydrate ($CuF_2 \cdot 2H_2O$) and 70 grams of finely divided, hydrogen-reduced metallic copper dispersed in 800 grams of toluene maintained at its boiling point. The water of hydration is continuously removed during agitation. Excess solubilized $BF_3$ was removed by refluxing the reaction mass after an essentially homogeneous solution has been obtained. Excess toluene phases out of solution as an upper layer. The resulting first complex contained 3 moles of toluene per mole of $CuBF_4$.

Through approximately 71.0 grams of the first complex prepared as above defined, was bubbled about 12.4 grams of a mixed gas containing 75 percent by weight carbon monoxide and 25 percent by weight of hydrogen. The temperature at which this mixed gas was brought into contact with the first complex was approximately 25° C. and the pressure approximately atmospheric. Upon completion of the introduction of the mixed gas into contact with the first complex, the resulting complex phase was heated to a temperature of approximately 70° to 75° C. at atmospheric pressure. Upon such heating, carbon monoxide was rapidly evolved. The evolved carbon monoxide was collected and subjected to analysis. On analysis, it was found that the carbon monoxide evolved represented 98 percent by weight of that passed into contact with the first complex. This carbon monoxide gas phase was found to contain 99 percent by weight carbon monoxide and less than 1 percent by weight of hydrogen.

EXAMPLE II

A mixed gas having the composition 75 percent by weight carbon monoxide, 25 percent by weight hydrogen, and less than 1 percent by weight nitrogen and/or other gases was bubbled through a cuprous fluoroborate containing first complex prepared as above described in example I. The temperature of contact of the mixed gas with the cuprous fluoroborate containing first complex was approximately 25° C. and the pressure was approximately atmospheric. The mixed gas was passed into contact with the first complex until approximately 12 grams of the gas had been introduced. During the period of introduction, the offgas was intermittently sampled and the samples subjected to analysis. It was found that the offgas had the composition 95.0 percent by weight hydrogen, 3.5 percent by weight nitrogen, and 1.5 percent by weight carbon monoxide. After cessation of the introduction of the mixed gas into contact with the first complex, the first complex was subjected to a temperature of approximately 85° to 90° C. thereby resulting in the rapid evolution of the carbon monoxide contained in said first complex. This carbon monoxide was collected and subjected to analysis. It was found that the carbon monoxide evolved from the first complex represented approximately 98.5 percent by weight of that initially present in the mixed gas and this carbon monoxide stream had the composition 99.5 percent by weight carbon monoxide, 0.4 percent by weight hydrogen and 0.1 percent by weight nitrogen. The amount of carbon monoxide introduced into contact with the first complex represented a cuprous fluoroborate-carbon monoxide mole ratio of 0.33:1.0.

EXAMPLE III

A mixed gas consisting of 58.1 percent by weight carbon monoxide, 12.6 percent by weight hydrogen, methane and inerts such as nitrogen and 29.3 percent by weight carbon dioxide was bubbled through a first complex prepared as above defined in example I for a period of 8 minutes or until an amount of carbon monoxide sufficient to result in a cuprous fluoroborate-carbon monoxide mole ratio of 0.33 had been obtained. The temperature during the period in which the mixed gas was bubbled through the first complex was approximately 27° C. and the pressure approximately 400 p.s.i.g. The resulting carbon monoxide containing complex was heated to a temperature of 90° C. and the pressure was reduced to 100 p.s.i.g. until substantially all of the carbon monoxide had been evolved from the complex. The carbon monoxide so obtained represented 96 percent by weight of that initially present in the mixed gas and had a composition 99.4 percent by weight carbon monoxide, 0.5 percent by weight hydrogen and less than 0.1 percent by weight carbon dioxide.

What is claimed is:

1. A process for the separation of carbon monoxide from mixed gases comprising contacting said mixed gases with a first complex comprised of a cuprous salt complex selected from the group consisting of (1) cuprous fluoroborate together with a hydrocarbon selected from the group consisting of aromatic hydrocarbons, olefin hydrocarbons and mixtures thereof and (2) cuprous fluorophosphate together with a hydrocarbon selected from the group consisting of aromatic hydrocarbons, olefin hydrocarbons and mixtures thereof, to form a resulting complex phase containing at least a portion of said carbon monoxide and thereafter recovering carbon monoxide from said resulting complex phase by contacting said resulting complex phase with at least a molar equivalent of a hydrocarbon selected from aromatic hydrocarbons, olefin hydrocarbons and mixtures thereof.

2. The process of claim 1 wherein the cuprous salt is cuprous fluoroborate.

3. The process of claim 1 wherein the cuprous salt is cuprous fluorophosphate.

4. The process of claim 1 wherein said aromatic hydrocarbons are selected from the group consisting of benzene, naphthalene, partially hydrogenated naphthalene, an alkyl benzene, an alkyl naphthalene and a partially hydrogenated alkyl naphthalene wherein the alkyl substituents have no more than four carbon atoms per constituent.

5. The process of claim 4 wherein said alkyl benzene is selected from the group consisting of toluene, ethylbenzene, ethyl toluene, the xylenes, and mixtures thereof.

6. The process of claim 1 wherein the temperature at which said mixed gases are contacted with said first complex are within the range of −30° to +90° C.

7. The process of claim 1 wherein the amount of first complex with which the mixed gases are contacted is such as to result in a mole ratio of first complex to carbon monoxide in said mixed gases of from about 0.3 to about 1.0.

8. The process of claim 1 wherein said carbon monoxide is recovered from said resulting complex phase by heating said resulting complex phase to a temperature of 30° to 150° C. in the presence of at least a molar equivalent of aromatic hydrocarbons, olefin hydrocarbons and mixtures thereof.

9. The process of claim 6 wherein the amount of said first complex with which the mixed gases are contacted is such as to result in a mole ratio of first complex to carbon monoxide in said mixed gases of from about 0.3 to about 1.0 and wherein said carbon monoxide is recovered from said resulting complex phase by heating said complex phase to a temperature of 30° to 150° C. in the presence of at least a molar equivalent of hydrocarbons selected from the group consisting of aromatic hydrocarbons, olefin hydrocarbons and mixtures thereof.

10. The process of claim 6 wherein said first complex is a cuprous salt complex selected from the group consisting of (1) cuprous fluoroborate together with toluene, and (2) cuprous fluorophosphate together with toluene and wherein carbon monoxide is recovered by from said resulting complex by contacting said resulting complex with at least a molar equivalent of toluene.

* * * * *

PO-1050
(5/69)

UNITED STATES PATENT OFFICE
CERTIFICATE OF CORRECTION

Patent No. 3,630,676      Dated December 28, 1871

Inventor(s) George D. Davis et al

It is certified that error appears in the above-identified patent and that said Letters Patent are hereby corrected as shown below:

Page 1, line 1, the name "George B. Davis" should read "George D. Davis".

Column 1, line 68, after the term "first complex" and --- ) ---.

Signed and sealed this 30th day of May 1972.

(SEAL)
Attest:

EDWARD M. FLETCHER, JR.       ROBERT GOTTSCHALK
Attesting Officer      Commissioner of Patents